(12) United States Patent
Niwa et al.

(10) Patent No.: US 7,598,734 B2
(45) Date of Patent: Oct. 6, 2009

(54) POSITION SENSOR WITH A SHIELD MEMBER FOR IMPROVING LINEARITY OF IMPEDANCE OF THE DETECTION COIL

(75) Inventors: Masahisa Niwa, Suita (JP); Yukiko Inooka, Takarazuka (JP); Yoshio Mitsutake, Kashiba (JP); Tomohiro Ota, Takarazuka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 381 days.

(21) Appl. No.: 11/574,610

(22) PCT Filed: May 12, 2006

(86) PCT No.: PCT/JP2006/309532

§ 371 (c)(1),
(2), (4) Date: Mar. 2, 2007

(87) PCT Pub. No.: WO2006/121145

PCT Pub. Date: Nov. 16, 2006

(65) Prior Publication Data

US 2008/0315868 A1    Dec. 25, 2008

(30) Foreign Application Priority Data

May 12, 2005 (JP) ............................ 2005-140207
May 12, 2005 (JP) ............................ 2005-140208

(51) Int. Cl.
*G01B 7/14* (2006.01)
(52) U.S. Cl. .............................. 324/207.16; 324/207.24
(58) Field of Classification Search ............. 324/207.16
See application file for complete search history.

(56) References Cited

U.S. PATENT DOCUMENTS 4,627,280 A * 12/1986 Hayashi et al. ........... 73/290 R
4,667,158 A * 5/1987 Redlich ................. 324/207.19

(Continued)

FOREIGN PATENT DOCUMENTS

JP          63-265115          11/1988

(Continued)

OTHER PUBLICATIONS

English language Abstract of JP 2001-21306.

(Continued)

*Primary Examiner*—Jay M Patidar
(74) *Attorney, Agent, or Firm*—Greenblum & Bernstein, P.L.C.

(57) ABSTRACT

A position sensor with excellent linearity of coil impedance is provided. This position sensor is equipped with a tubular detection coil, a magnetic core movable in the detection coil, a drive circuit for the detection coil, a signal processing circuit for converting a change in impedance of the detection coil into an electric signal, and a shield member disposed around the detection coil. The shield member is a tubular member having a first inner surface for surrounding an axial region of the detection coil, and a second inner surface for surrounding another axial region of the detection coil. The tubular member is formed such that a distance between the second inner surface and the detection coil is smaller than the distance between the first inner surface and the detection coil.

12 Claims, 8 Drawing Sheets

U.S. PATENT DOCUMENTS

| | | | |
|---|---|---|---|
| 4,912,409 A * | 3/1990 | Redlich et al. | 324/207.13 |
| 6,909,279 B2 | 6/2005 | Niwa | |
| 2006/0164075 A1 | 7/2006 | Niwa | |

FOREIGN PATENT DOCUMENTS

| | | |
|---|---|---|
| JP | 64-6515 | 1/1989 |
| JP | 2001-21306 | 1/2001 |
| WO | 2004/099727 | 11/2004 |

OTHER PUBLICATIONS

English language Abstract of JP 63-265115.

* cited by examiner

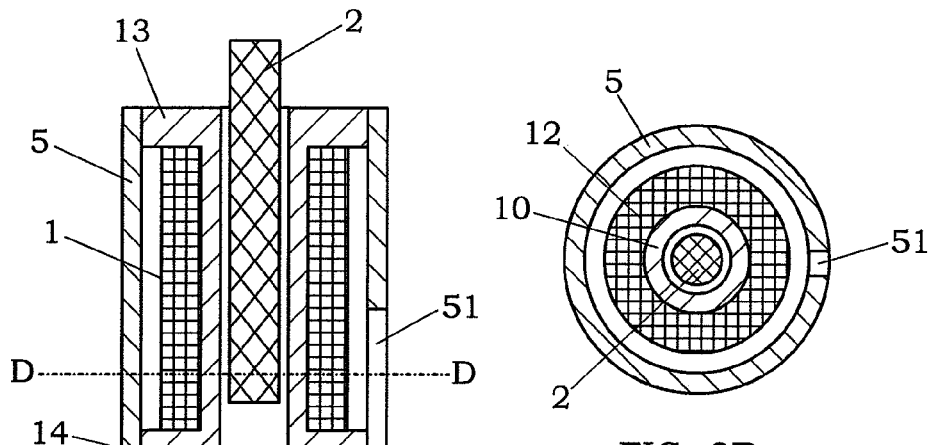
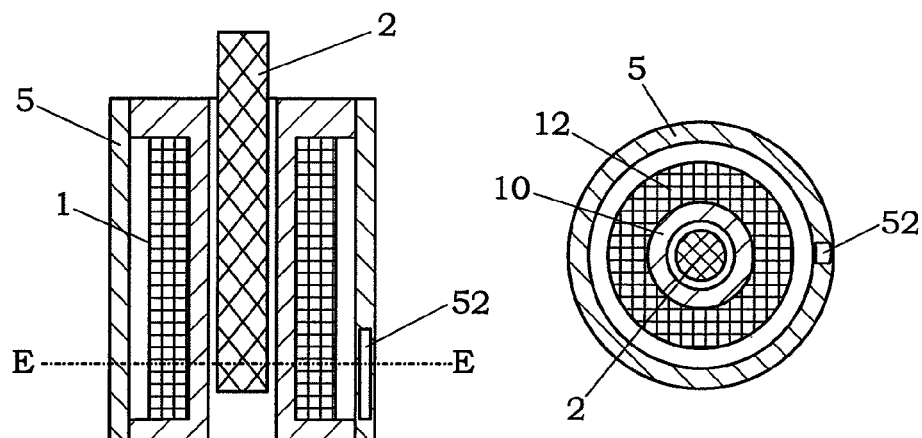
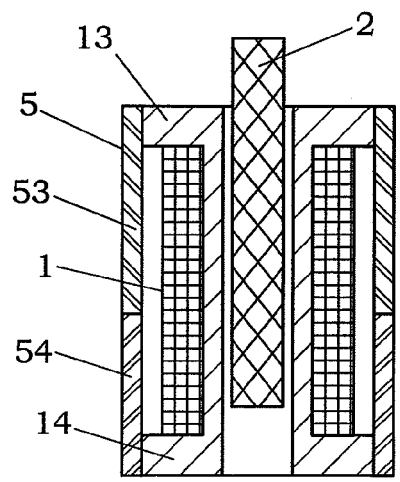

ic signal, and a shield member disposed around the detection coil. The shield member is characterized by having at least one of the following features (a) to (c) for improving the linearity of impedance of the detection coil:

(a) the shield member is a tubular member having an axial region, which is formed in an electrically discontinuous manner with respect to a circumferential direction of the tubular member;
(b) the shield member is a tubular member having a first shield portion for surrounding an axial region of the detection coil, and a second shield portion for surrounding another axial region of the detection coil, and the second shield portion is made of a material having a different electric conductivity or magnetic permeability from the first shield portion;
(c) the shield member is a tubular member having a first inner surface for surrounding an axial region of the detection coil, and a second inner surface for surrounding another axial region of the detection coil, and a distance between the second inner surface and the detection coil is smaller than the distance between the first inner surface and the detection coil.

According to the shield member having the above feature (a) of the present invention, since an eddy current flows in a portion, which is not formed in the electrically discontinuous manner with respect to the circumferential direction of the tubular shield member, a part of magnetic fluxes generated from the detection coil is cancelled. However, since the eddy current does not flow in the portion formed in the electrically discontinuous manner with respect to the circumferential direction of the shield member, the magnetic fluxes generated from the detection coil are not cancelled. Therefore, when an appropriate portion of the shield member is formed in the electrically discontinuous manner with respect to the circumferential direction, a deviation from the ideal characteristic of the coil impedance can be corrected by intentionally changing an increasing amount of coil impedance in a specific displacement range of the magnetic core.

In addition, according to the shield member having the above feature (b), since magnetic flux density as well as inductance are increased by use of the shield member made of the material having a high electrical conductivity or magnetic permeability, it is possible to intentionally increase the increasing amount of coil impedance in the specific displacement range of the magnetic core. Therefore, when the formation areas of the first and second shield portions and the kinds of materials for them are appropriately determined, it becomes possible to correct the deviation from the ideal characteristic of the coil impedance.

Furthermore, according to the shield member having the above feature (c), a large amount of eddy current flows in a region of the shield member, which has the second inner surface spaced from the detection coil by a small distance, and on the contrary the amount of eddy current decreases at another region of the shield member, which has the first inner surface spaced from the detection coil by a large distance. Therefore, when the formation areas of the first and second inner surfaces and the distances between the detection coil and them are appropriately determined, the deviation from the ideal characteristic of the coil impedance can be corrected by intentionally changing an increasing amount of coil impedance in a specific displacement range of the magnetic core.

From these reasons, the linearity of coil impedance of the position sensor can be improved by use of the shield member having the above feature (a), (b) or (c). In addition, the technical concept of the present invention includes improving the

POSITION SENSOR WITH A SHIELD MEMBER FOR IMPROVING LINEARITY OF IMPEDANCE OF THE DETECTION COIL

TECHNICAL FIELD

The present invention relates to a position sensor using a change in impedance of a detection coil caused by a displacement of a magnetic core.

BACKGROUND ART

A position sensor, which has the capability of outputting an electrical signal according to a change in impedance of a tubular detection coil caused by a physical displacement of a magnetic core in the detection coil, has been utilized for measurement and control in many technical fields such as internal combustion and electric power facility. In this kind of position sensor, from the standpoint of improving the reliability in detection accuracy, it is desired that the impedance of the detection coil linearly changes depending on the displacement of the magnetic core. However, in fact, as the displacement amount of the magnetic core increases, a deviation from the ideal characteristic occurs, as shown in FIG. 15. To ensure stable detection accuracy, it is proposed to use only a movable range of the magnetic core where the impedance linearly changes. However, when it is important to downsize the position sensor, it is not possible to disregard the other movable range of the magnetic core where the deviation from the ideal characteristic occurs.

For example, International Publication No. WO2004/099727 discloses an improvement in the linearity of coil impedance in this kind of position sensor. That is, it is proposed to effectively improve the impedance linearity that an end portion of the magnetic core is formed thick, or surface-treated with a material having high magnetic permeability, or the number of coil winding turns is increased at an end portion of the detection coil. However, the thickened end portion of the magnetic core leads to an increase in size in a diameter direction of the detection coil, in which the magnetic core is inserted. In addition, since a mechanical resonance frequency lowers due to an increase in weight of the end portion, deterioration in vibration resistance may occur. On the other hand, when a magnetic plating is performed to only a part of a rod-like core, an increase in production cost easily occur in terms of workability and quality control. Moreover, when changing the number of coil winding turns of the detection coil, the structure of a coil bobbin easily becomes complex to prevent the occurrence of disordered winding. In addition, an extension of time needed for an operation of winding a coil wire around the coil bobbin may result in an increase in production cost.

SUMMARY OF THE INVENTION

In view of the above problems, a primary concern of the present invention is to provide a position sensor, which has the capability of improving the linearity of coil impedance without making a design change in the structure of a magnetic coil and a detection coil.

That is, the position sensor of the present invention comprises a tubular detection coil, a magnetic core movable in the detection coil, a drive circuit configured to provide a constant alternating voltage or a constant alternating current to the detection coil, a signal processing circuit configured to convert a change in impedance of the detection coil caused by a displacement of the magnetic core in the detection coil into an linearity of coil impedance by use of the shield member having an optional combination of the above features (a), (b) and (c).

As a preferred embodiment of the shield member having the above feature (a), it is preferred that the axial region of the shield member has a substantially C-shaped cross section. In this case, by a relatively simple structure that a slit is formed in a sidewall of the tubular member, it is possible to certainly achieve the electrical discontinuity with respect to the circumferential direction of the tubular member. The width, length and shape of the slit can be appropriately determined according to factors such as distance between the detection coil and the shield member, distance between the detection coil and the magnetic core and electrical conductivity of the magnetic core or the shield member.

As a preferred embodiment of the shield member having the above feature (c), it is preferred that the shield member is formed with an outer tube and an inner tube having an axial length smaller than the outer tube, and the inner tube is disposed in the outer tube. In particular, it is preferred that the inner tube is made of a material having a different electric conductivity or magnetic permeability from the outer tube. In this case, the linearity of coil impedance is improved by the shield member having both of the above features (b) and (c). It is also preferred that the inner tube is made of ferrite having a low electrical conductivity, in which an eddy current hardly flows. Moreover, it is preferred that a required axial region of the outer tube or the inner tube has a substantially C-shaped cross section. In this case, the linearity of coil impedance is improved by the shield member having both of the above features (a) and (c). If necessary, the inner tube can be disposed such that an outer surface of the inner tube directly contacts an inner surface of the outer tube. Alternatively, an electrical insulating layer (including air) may be provided between the inner tube and the outer tube.

In the position sensor of the present invention, when the shield member is made of a ferromagnetic material, and at least has an axial length substantially equal to the detection coil, and more preferably the axial length including a movable range of the magnetic core and a total length of the detection coil, the detection coil can be magnetically shielded to reduce the influence of a change in impedance or an induced electromotive force resulting from operation environment. In addition, it is preferred that the shield member has a plating layer of a metal material having high electrical conductivity on its outer surface.

It is also preferred that the shield member of the present invention is electrically connected to a stable potential point of one of the drive circuit and the signal processing circuit. In this case, a further increased shield effect against radiation noise can be obtained.

Further characteristics of the present invention and advantages brought thereby will become more apparent from the best mode for carrying out the invention described below.

BRIEF EXPLANATION OF THE DRAWINGS

FIG. 3A is a cross-sectional view of a relevant portion of the position sensor and FIG. 3B is a horizontal cross-sectional view taken along the line D-D of FIG. 3A;

FIG. 4A is a cross-sectional view of a relevant portion of a position sensor according to a modification of the first embodiment, and FIG. 4B is a horizontal cross-sectional view taken along the line E-E of FIG. 4A;

FIG. 5 is a cross-sectional view of a relevant portion of a position sensor according to a second embodiment of the present invention;

BEST MODE FOR CARRYING OUT THE INVENTION

A position sensor of the present invention is explained in detail below according to preferred embodiments.

(Basic Structure)

Figure 1A:
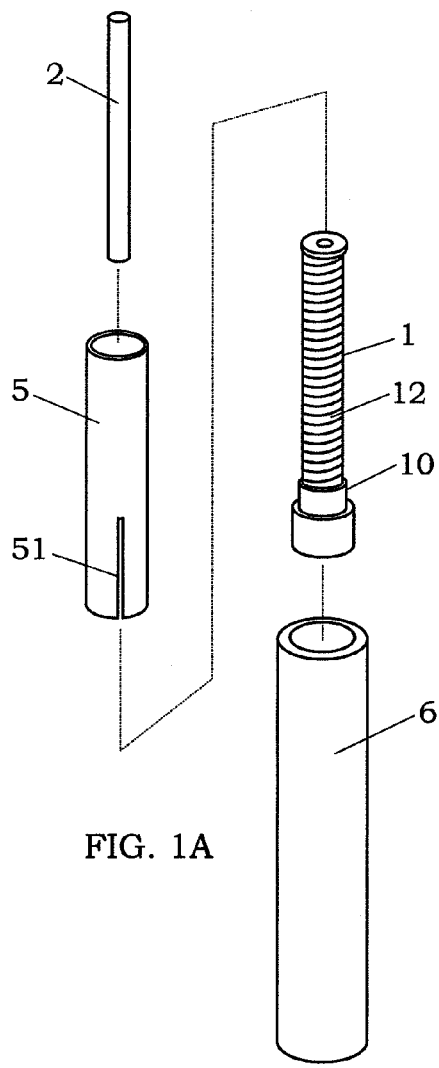
FIGS. 1A and 1B are respectively exploded perspective and cross-sectional views of a position sensor according to a first embodiment of the present invention.
Figure 1B:
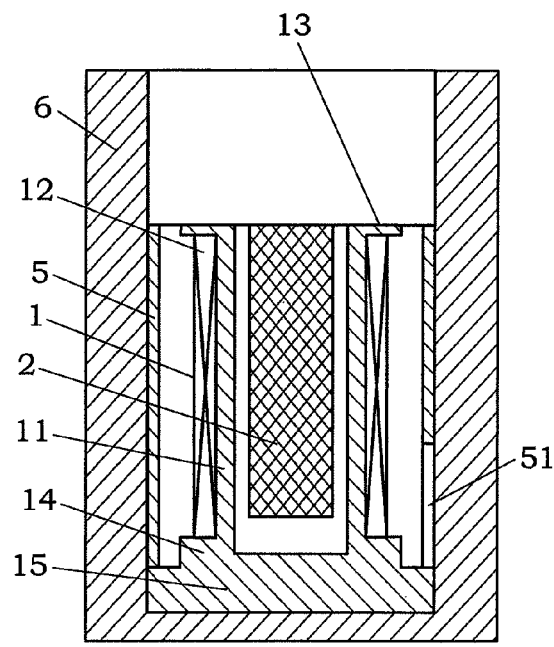
Figure 2:
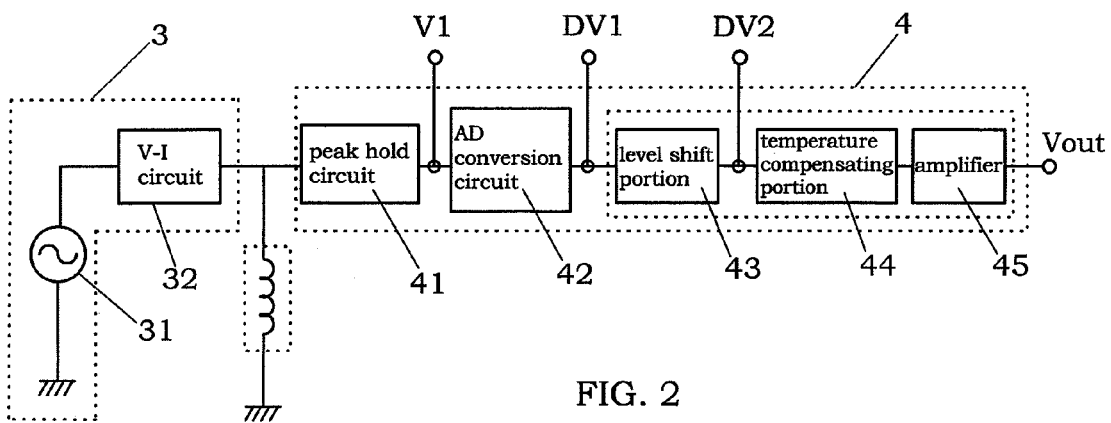
FIG. 2 is a block diagram of a drive circuit and a signal processing circuit of the position sensor.

First, a basic structure of the position sensor is explained. As shown in FIGS. 1A, 1B and 2, this position sensor is mainly composed of a tubular detection coil 1, a magnetic core 2 movable in the detection coil 1, a drive circuit 3 for providing a constant alternating voltage or a constant alternating current to the detection coil 1, a signal processing circuit 4 for converting a change in impedance of the detection coil 1 caused by a displacement of the magnetic core 2 in the detection coil 1 into an electric signal; a shield member 5 disposed around the detection coil 1, and a case 6 for accommodating the shield member 5 therein.

The detection coil 1 is formed by winding a lead wire 12 around a coil bobbin 10 having a substantially cylindrical shape. The coil bobbin 10 can be made of a thermosetting resin or the like. As shown in FIG. 1B, the coil bobbin 10 is integrally equipped with a winding body 11 formed in a long cylindrical shape having openings at its opposite ends, a first flange 13 formed in a circular-ring shape at an upper side of the winding body 11, a second flange 14 formed in a disk shape at a lower side of the winding body to close the bottom opening, and a pedestal 15 formed in a disk shape at the lower side of the second flange.

On the other hand, the magnetic core 2 is formed in a long, round bar shape by use of a magnetic material such as ferrite. In this embodiment, the winding body 11 is formed such that an axial length (a size in up and down direction) of the winding body is larger than the axial length (a size in up and down direction) of the magnetic core 2. In addition, since an inner diameter of the winding body 11 is larger than an outer diameter of the magnetic core 2, the magnetic core 2 can be moved (displaced) in the axial direction in the coil bobbin 10. The pedestal 15 has a larger outer diameter than the second flange 14, and the shield member 5 is placed on this pedestal 15.

The shield member 5 is accommodated in the case 6 formed in a long cylindrical shape having a top opening and a closed bottom end by use of an insulating resin. An inner diameter of the case 6 is slightly larger than an outer diameter of the shield member 5, and an axial length (a size in up and down direction) of the case is larger than the axial length (a size in up and down direction) of the detection coil 1.

The drive circuit 3 is not limited, and therefore a conventional one can be used. For example, as shown in FIG. 2, the drive circuit 3 is a constant current circuit for outputting a constant current having required frequency and amplitude to the detection coil. The constant current circuit is provided with an oscillation circuit 31 for generating a constant voltage obtained by superimposing an alternating voltage having required frequency and amplitude on a direct-current voltage having a required amplitude, and a V-I circuit (voltage-current conversion circuit) 32 for converting the constant voltage output from the oscillation circuit into a constant current.

The signal processing circuit 4 is not specifically limited, and therefore a conventional one can be used. For example, as shown in FIG. 2, the signal processing circuit 4 outputs an output signal Vout indicative of a positional information of the magnetic core relative to the detection coil according to a peak value V1 of a voltage across the detection coil (detection signal), which is determined by the impedance of the detection coil and the constant current output from the drive circuit 3. In this embodiment, the signal processing circuit 4 is provided with a peak hold circuit 41, an AD conversion circuit 42, and a digital operation block including a level shift portion 43, a temperature compensating portion 44 and an amplifier 45. In the peak hold circuit 41, the peak value V1 of the voltage across the detection coil is extracted. In the AD conversion circuit 42, the peak value is converted into a digital signal DV1. In the level shift portion 43 of the digital operation block, a level shift is performed as a digital signal operation by the addition of a required digital amount to output a digital signal DV2. In the temperature compensating portion 44, an operation for temperature compensation is performed to the digital signal DV2. In the amplifier 45, a digital signal output from the temperature compensating portion 44 is amplified to provide the output signal Vout.

FIRST EMBODIMENT

The present embodiment is characterized by using the shield member 5 having the following features in the position sensor with the basic structure described above. That is, the shield member 5 of this embodiment has a tubular structure, in which the detection coil 1 can be accommodated, and a required axial region of the shield member 5 is formed in an electrically discontinuous manner with respect to the circumferential direction.

As such a shield member 5, for example, it is possible to use a tubular member shown in FIGS. 3A and 3B. This tubular member is formed such that the first and second flanges (13, 14) of the coil bobbin 10 contact an inner surface of the tubular member. In addition, the required axial region of the shield member 5 has a slit 51 for providing the electrical discontinuity with respect to the circumferential direction. In brief, as shown in FIG. 3B, the tubular member having a substantially C-shaped cross section in the required axial region can be used as the shield member 5. In this embodiment, the slit 51 is formed in the axial direction over a predetermined length from the bottom end of the coil bobbin. This shield member 5 can be readily manufactured by rolling a metal thin sheet or laser machining the slit 51 in a pipe material.

Alternatively, as shown in FIGS. 4A and 4B, a tubular member having a hollow portion 52, which is formed in a sidewall of the tubular member over a required axial length, may be used as the shield member 5. In this embodiment, the hollow portion 52 is formed in the axial direction over a required length from a position corresponding to a top surface of the second flange 14. From the viewpoints of the easiness of manufacturing and the ensuring of magnetic shield performance, it is preferred that the shield member 5 is made of a metal material, and particularly a ferromagnetic metal material.

In the case of using these shield members 5, an increasing amount of coil impedance in a specific displacement range of the magnetic core 2 can be intentionally changed, so that it becomes possible to improve the linearity of impedance over all. The size and shape of the slit 51 or the hollow portion 52 of the shield member 5 can be appropriately determined to improve the linearity of coil impedance of the position sensor in consideration of other factors such as distance between the detection coil 1 and the shield member 5, distance between the detection coil 1 and the magnetic core 2, and electrical conductivity of the magnetic core 2 and the shield member 5.

SECOND EMBODIMENT

The present embodiment is characterized by using a shield member 5 having the following features in the position sensor with the basic structure described above. That is, the shield member 5 of this embodiment has a tubular structure, in which the detection coil 1 can be accommodated. In addition, the shield member 5 is a metallic tubular member formed such that the property of material is not uniform in an axial direction (a stroke direction of the magnetic core). Specifically, it is possible to use a tubular member shown in FIG. 5 as the shield member 5. This tubular member is formed such that the first and second flanges (13, 14) of the coil bobbin 10 contact an inner surface of the tubular member. In addition, the tubular member has a first shield portion 53 for surrounding an axial region of the detection coil 1, which is defined over a required axial length from the contact position with the first flange 13, and a second shield portion 54 for surrounding another axial region of the detection coil 1, which is defined between a bottom end of the first shield portion 53 and the contact position with the second flange 14. The first shield portion 53 is made of a material having a different electrical conductivity or magnetic permeability from the second shield portion 54. As the material of the first shield portion 53, an iron-based metal material is available. From the reasons described later, it is particularly preferred to use ferrite. On the other hand, as the material of the second shield portion 54, copper, a copper-nickel alloy, gold or silver is available. Due to the cost advantage, it is preferred to use copper or a copper alloy. In this embodiment, the shield member 5 is formed such that the distance between the first shield portion 53 and the detection coil 1 is substantially equal to the distance between the second shield portion 54 and the detection coil 1.

In the case of using the shield member of this embodiment, an increasing amount of coil impedance in a specific displacement range of the magnetic core 2 can be intentionally changed by appropriately determining the formation areas of the first and second shield portions (53, 54) and the kinds of materials for them. As a result, it becomes possible to improve the linearity of impedance over all. In this embodiment, the shield portions are provided by the two kinds of materials arranged in the axial direction. If necessary, the shield portions may be formed by use of three or more kinds of materials arranged in the axial direction. In this case, a deviation from the ideal characteristic of coil impedance can be corrected in more detail.

THIRD EMBODIMENT

The present embodiment is characterized by using a shield member 5 having the following features in the position sensor with the basic structure described above. That is, the shield member 5 of this embodiment has a tubular structure, in which the detection coil 1 can be accommodated. In addition, the shield member 5 has a first inner surface for surrounding an axial region of the detection coil, and a second inner surface for surrounding another axial region of the detection coil, which are formed such that a distance between the second inner surface and the detection coil is smaller than the distance between the first inner surface and the detection coil.

Figure 6:
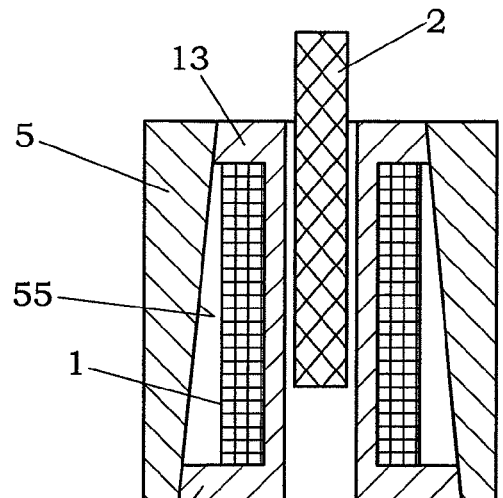
FIG. 6 is a cross-sectional view of a relevant portion of a position sensor according to a third embodiment of the present invention.

As such a shield member 5, for example, it is possible to use a tubular member shown in FIG. 6. This tubular member is formed such that the first and second flanges (13, 14) of the coil bobbin 10 contact an inner surface of the tubular member. In addition, the tubular member has an inner surface 55 formed in a tapered shape such that an inner diameter of its one end is smaller than the inner diameter of the opposite end. In this embodiment, the outer diameter of the shield member 5 is substantially constant in the axial direction. In addition, the shield member 5 is disposed around the detection coil 1 so as to have a smaller inner diameter at an end corresponding to the first flange 13 than the end corresponding to the second flange 14. An inclination angle of the tapered inner surface 55 can be appropriately determined to improve the linearity of coil impedance of the position sensor in consideration of other factors such as distance between the detection coil 1 and the shield member 5, distance between the detection coil 1 and the magnetic core 2, and electrical conductivity of the magnetic core 2 and the shield member 5.

Figure 7A:
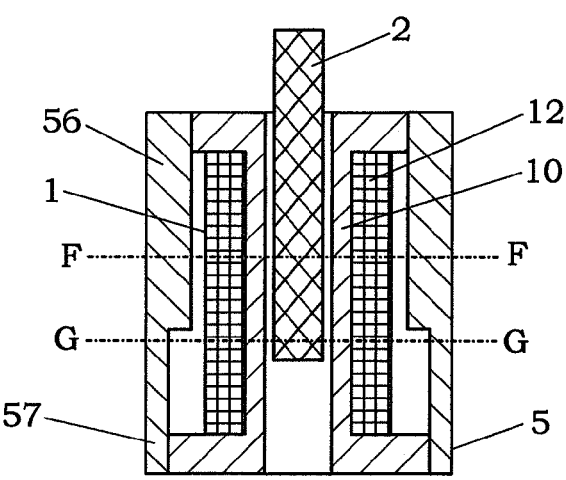
FIG. 7A is a cross-sectional view of a relevant portion of a position sensor according to a first modification of the third embodiment.
Figure 7B:
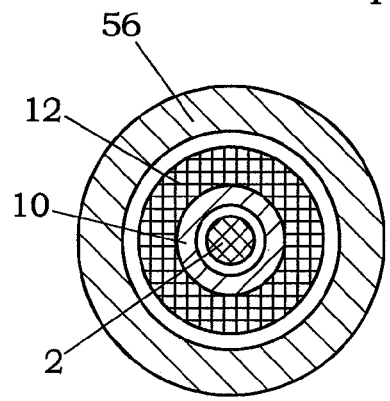
FIG. 7B is a horizontal cross-sectional view taken along the line F-F of FIG. 7A.
Figure 7C:
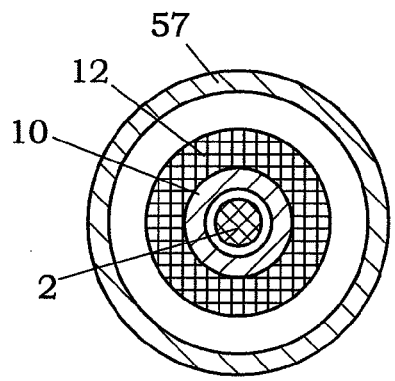
FIG. 7C is a horizontal cross-sectional view taken along the line G-G of FIG. 7A.

In addition, a tubular member shown in FIGS. 7A to 7C can be used as the shield member 5. This tubular member is formed with a first tubular portion 56 having a constant wall thickness over a required axial region, and a second tubular portion 57 extending over the remaining axial region. The second tubular portion 57 has a constant wall thickness smaller than the first tubular portion 56. In this case, since the detection coil 1 is located closer to the first tubular portion 56 having the larger wall thickness than the second tubular portion 57, an increasing amount of coil impedance in a specific displacement range of the magnetic core 2 can be intentionally changed. In this embodiment, the outer diameter of the shield member 5 is substantially constant in the axial direction. The above explanation is directed to the shield member 5 having the two tubular portions with different wall thicknesses in the axial direction. If necessary, the shield member 5 may have three or more tubular portions with different wall thicknesses to improve the linearity of coil impedance.

Figure 8A:
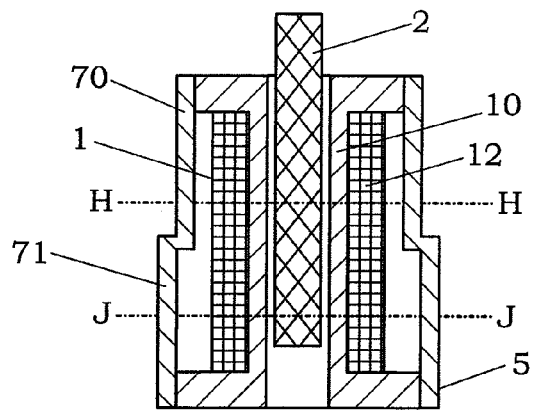
FIG. 8A is a cross-sectional view of a relevant portion of a position sensor according to a second modification of the third embodiment.
Figure 8B:
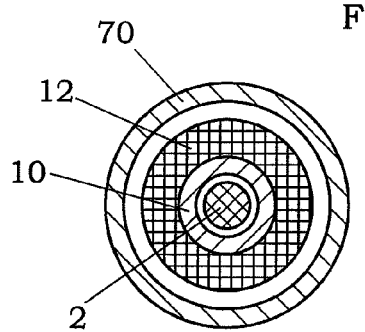
FIG. 8B is a horizontal cross-sectional view taken along the line H-H of FIG. 8A.
Figure 8C:
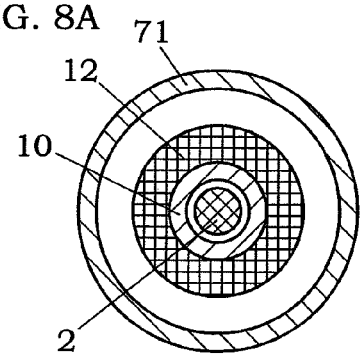
FIG. 8C is a horizontal cross-sectional view taken along the line J-J of FIG. 8A.

Alternatively, a tubular member shown in FIGS. 8A to 8C may be used as the shield member 5. This tubular member is formed with a first tubular portion 70 having a constant outer diameter over a required axial region, and a second tubular portion 71 extending over another axial region. The second tubular portion 71 has the same wall thickness as the first tubular portion 70, but an outer diameter of the second tubular portion 71 is larger than that of the first tubular portion 70. This shield member 5 can be readily manufactured by drawing a metal material. The above explanation is directed to the shield member 5 having the two tubular portions with different outer diameters in the axial direction. If necessary, the shield member 5 may have three or more tubular portions with different outer diameters to improve the linearity of coil impedance.

Figure 9A:
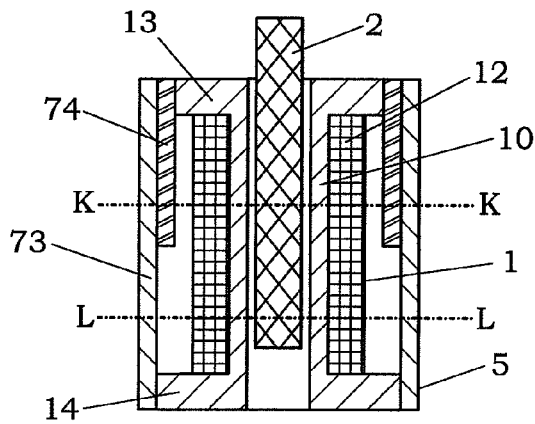
FIG. 9A is a cross-sectional view of a relevant portion of a position sensor according to a third modification of the third embodiment.
Figure 9B:
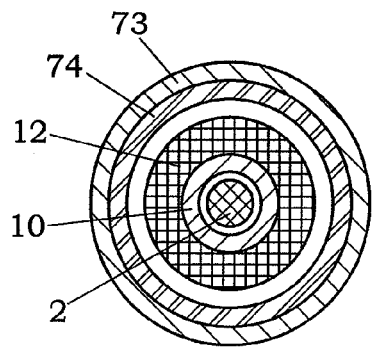
FIG. 9B is a horizontal cross-sectional view taken along the line K-K of FIG. 9A.
Figure 9C:
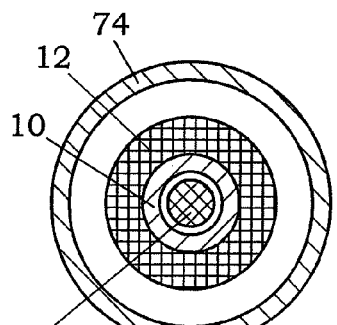
FIG. 9C is a horizontal cross-sectional view taken along the line L-L of FIG. 9A.

It is also preferred to use a tubular member shown in FIGS. 9A to 9C as the shield member 5. This shield member 5 is formed in a double tubular structure with an outer tube 73 and an inner tube 74 disposed in the outer tube 73 and having a shorter axial length than the outer tube 73. In the present embodiment, the shield member 5 is disposed such that the first flange 13 contacts an inner surface of the inner tube 74 and the second flange 14 contacts an inner surface of the outer tube 73. The outer and inner tubes (73, 74) can be made of a same material. Alternatively, as described in the second embodiment, they may be made of materials having different electrical conductivity or magnetic permeability. In the case of using the outer and inner tubes (73, 74) made of the materials having different electrical conductivity or magnetic permeability, the shield member is characterized in that the distance between the shield member 5 and the detection coil 1 is different in the axial direction, and also the kind of material of the shield member is different in the axial direction. Therefore, this shield member 5 possesses both features of the second embodiment and the present embodiment. The above explanation is directed to the shield member having the double tubular structure, as shown in FIG. 9A. If necessary, the shield member may have a triple or more tubular structure. In this case, the shield member is formed with at least three regions having different distances between the detection coil and the shield member in the axial direction.

Figure 10A:
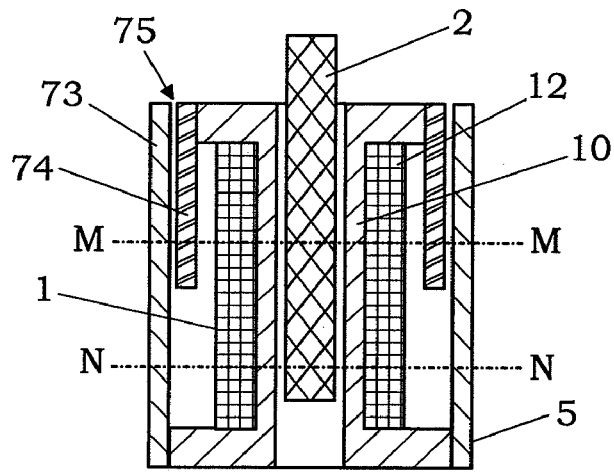
FIG. 10A is a cross-sectional view of a relevant portion of a position sensor according to a fourth modification of the third embodiment.
Figure 10B:
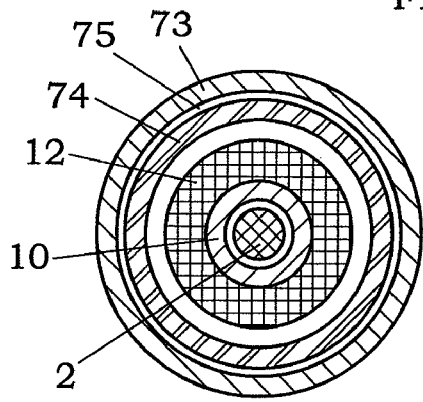
FIG. 10B is a horizontal cross-sectional view taken along the line M-M of FIG. 10A.
Figure 10C:
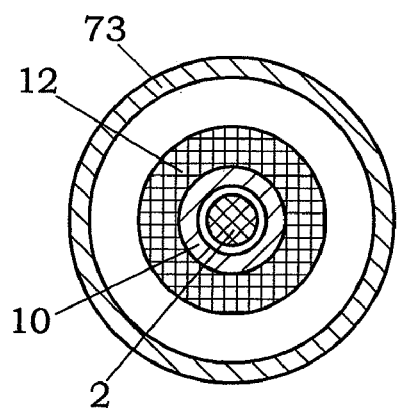
FIG. 10C is a horizontal cross-sectional view taken along the line N-N of FIG. 10A.
Figure 11A:
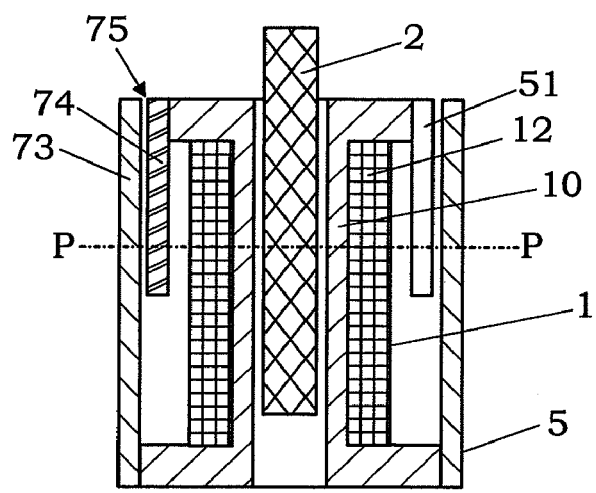
FIG. 11A is a cross-sectional view of a relevant portion of a position sensor according to a fifth modification of the third embodiment.
Figure 11B:
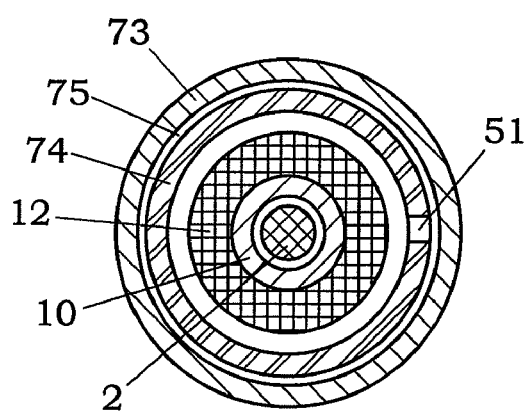
FIG. 11B is a horizontal cross-sectional view taken along the line P-P of FIG. 11A.

In addition, as shown in FIGS. 10A to 10C, an insulating layer 75 may be formed between the inner tube 74 and the outer tube 73 of the shield member 5 having the double tubular structure described above. In the present embodiment, the inner tube 74 is supported by the first flange 13 of the detection coil 1, and the outer tube 73 is supported by the second flange 14 of the detection coil 1. The insulating layer 75 is provided by an air between the inner tube 74 and the outer tube 73. The insulating layer is not limited to the air, and therefore may be formed by use of another electrical insulating material. In addition, as shown in FIGS. 11A and 11B, a slit 51 may be formed in the shield member 5 shown in FIG.

10A over the entire length of the inner tube 74. In this case, the slit 51 is formed in the inner tube 74 having a shorter length than the outer tube 73, which defines the entire length of the shield member 5. It means that a required axial region of the shield member 5 is formed in an electrically discontinuous manner with respect to the circumferential direction. This is equivalent to the feature of the shield member of the first embodiment. Therefore, it can be said that this shield member 5 has all of the features of the first to third embodiments. In place of the slit 51, a hollow portion may be formed in the inner tube, as introduced in the first embodiment. In addition, the slit 51 or the hollow portion may be formed in a required axial region of the outer tube 73 in place of the inner tube 74.

A flow pattern of eddy current in the shield member 5 changes depending on the cross-sectional shape and size of the shield member. On the other hand, a change amount of coil impedance caused when the magnetic core 2 is displaced by a unit length is influenced by the flow pattern of eddy current. Therefore, by appropriately determining the cross-sectional shape and size of each of the shield members described in the present embodiment, an increasing amount of coil impedance in a specific displacement range of the magnetic core 2 can be intentionally changed, so that it becomes possible to improve the linearity of impedance over all.

In addition, when using the shield member 5 having the double tubular structure, it is preferred that the inner tube 74 is made of an iron-based metal that is a ferromagnetic material to obtain a desired magnetic shield effect. In particular, it is preferred to use ferrite from the following reason. That is, since a general position sensor has a self-resonant frequency within a frequency band of several hundreds kHz to several tens MHz, it easily receives an influence of radiation noise in this frequency band. However, ferrite has a remarkable shield effect against this frequency band. Therefore, the influence of radiation noise in the above frequency band can be reduced by use of ferrite. In addition, the easiness of machining or processing is one of the advantages of ferrite. If necessary, it is preferred to perform a rust prevention treatment because ferrite easily rusts. It is also preferred that the outer tube 73 is made of a conductive material (e.g., copper, copper-nickel alloy, gold, silver) having higher electrical conductivity than the magnetic metal material used for the inner tube.

Next, an effect of reducing a change amount of impedance by using the shield member is explained according to the following test results.

Figure 12A:
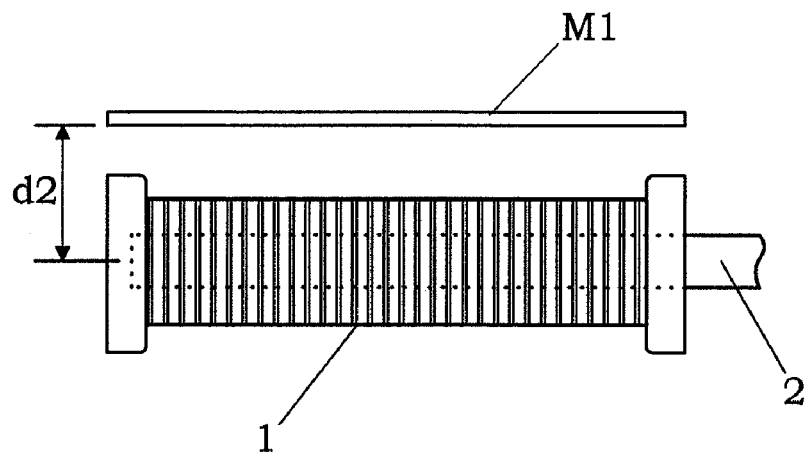
FIGS. 12A to 12C are schematic diagrams each showing a test condition for evaluating a shield effect of a shield member.
Figure 12B:
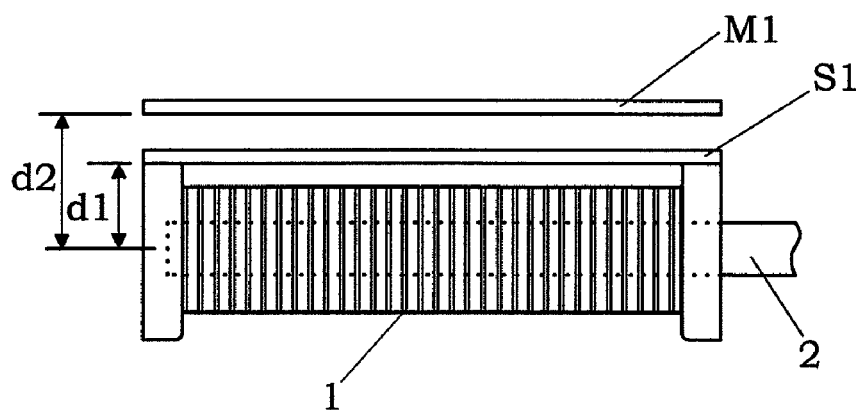
Figure 12C:
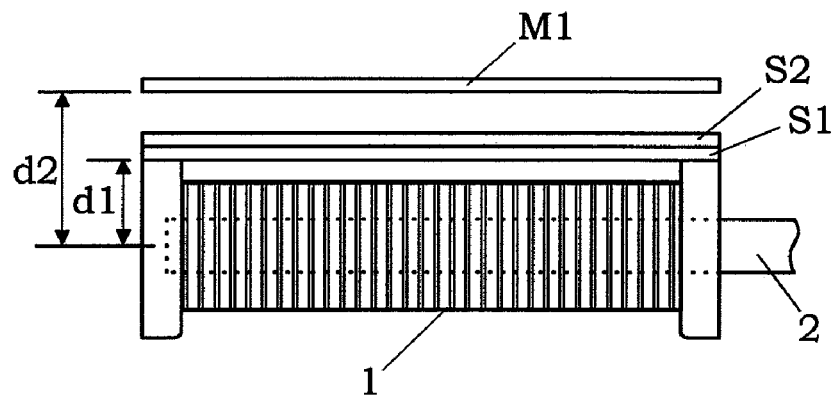

That is, as the test condition 1, the impedance of the detection coil 1 was measured under a condition that a metal plate M1 is placed at a position spaced from the detection coil by a predetermined distance d2, as shown in FIG. 12A. In addition, the impedance of the detection coil 1 was measured under a condition that the metal plate M1 is not placed. A change amount of impedance therebetween was calculated. Next, as the test condition 2, the impedance was measured under a condition that an iron shield member S1 is placed at a position spaced from the detection coil 1 by a predetermined distance d1, and between the detection coil 1 and the metal plate M1, as shown in FIG. 12B. As in the case of the test condition 1, the change amount of impedance was calculated. Moreover, as the test condition 3, the impedance was measured under a condition that a shield member having a double structure, which is composed of an iron shield member S1 and an additional shield member S2 that is a copper plating layer formed on an outer surface of the iron shield member S1, is placed at a position spaced from the detection coil 1 by a predetermined distance d1, and between the detection coil 1 and the metal plate M1, as shown in FIG. 12C. As in the case of the test condition 1, the change amount of impedance was calculated. As the metal plate M1, three kinds of metal plates having a same thickness, i.e., iron, aluminum and brass plates were used. With respect each of the metal plates, the above tests were performed under the same conditions. Other test conditions such as insert amount of the magnetic core and impedance measuring frequency are constant. Results are listed in Table 1.

TABLE 1

| | THE KIND OF METAL PLATE M | | |
|---|---|---|---|
| | IRON | ALUMINUM | BRASS |
| TEST CONDITION 1 | −0.53% | −0.91% | −0.90% |
| TEST CONDITION 2 | −0.12% | −0.37% | −0.37% |
| TEST CONDITION 3 | −0.04% | −0.29% | −0.26% |

As clearly understood from the above results, the change in coil impedance can be effectively reduced by placing the shield member S1, and particularly the shield member having the double structure (S1, S2).

Figure 13:
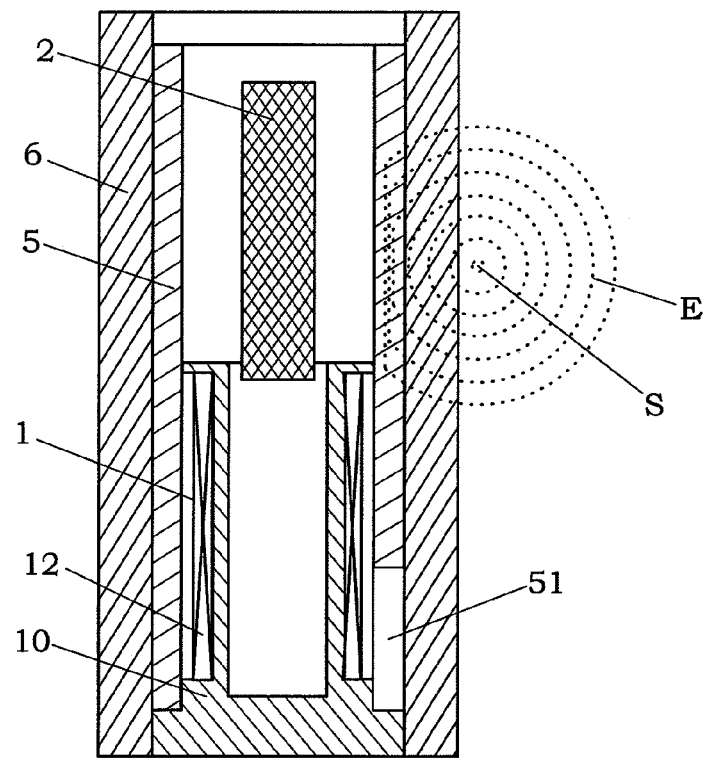
FIG. 13 is a cross-sectional view of a position sensor having a shield performance over the entire working range of a core according to a preferred embodiment of the present invention.

In the position sensor of each of the above-described embodiments, for example, it is preferred that the axial length of the shield member 5 is not smaller than a distance corresponding to the movable range of the magnetic core 2, as shown in FIG. 13. In this case, the magnetic core 2 can be always shielded. Therefore, even when an outer conductor S is disposed in the vicinity of the shield member, most of magnetic fluxes of an external magnetic field E generated from the outer conductor S do not pass through the shield member. As a result, the magnetic fluxes of the external magnetic field E do not make interlinkage with the detection coil 1 to prevent that an induced electromotive force is generated in the detection coil 1 by the external magnetic field E. In addition, from the viewpoint of further improving the shield effect, it is preferred to form a plating layer of a metal material having high electrical conductivity on the outer surface of the shield member.

Figures 14A, 14B:
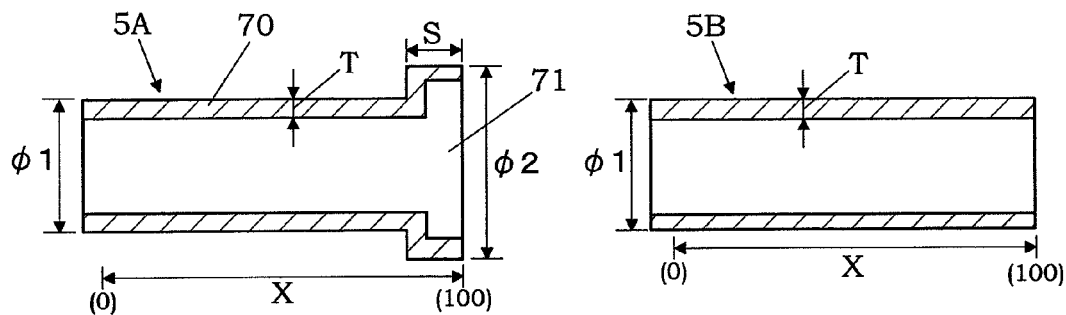
FIG. 14A is a cross-sectional view of a shield member of the present invention.
FIG. 14B is a cross-sectional view of a conventional shield member.

Next, an effect of improving the linearity of impedance by using the shield member of the present invention is explained according to concrete examples. As shown in FIG. 14A, a shield member 5A of the present invention used in an impedance evaluation test is the same type as the shield member 5 of FIG. 8A of the third embodiment. This shield member 5A is made of a stainless steel (SUS304), and composed of a first tubular portion 70 having a small diameter and a second tubular portion 71 having a large diameter. The outer diameter $\phi 1$ of the first tubular portion 70 is 12 mm, and the outer diameter $\phi 2$ of the second tubular portion 71 is 16 mm. The first tubular portion 70 and the second tubular portion 71 of the shield member have a same wall thickness T that is 0.5 mm constant. In addition, an axial length S of the second tubular portion 71 is 5 mm. On the other hand, a comparative shield member 5B was made of a stainless steel (SUS304), and has a cylindrical shape having a constant diameter ($\phi 1 = 12$ mm). The axial length and the wall thickness T of the comparative shield member are the same as them of the shield member 5A shown in FIG. 14A. In each of FIGS. 14A and 14B, the right end of the shield member corresponds to a position that the displacement (X) is 100 mm, and the left end thereof is formed to be slightly longer than a position that the displacement (X) is 0 mm.

Figure 15:
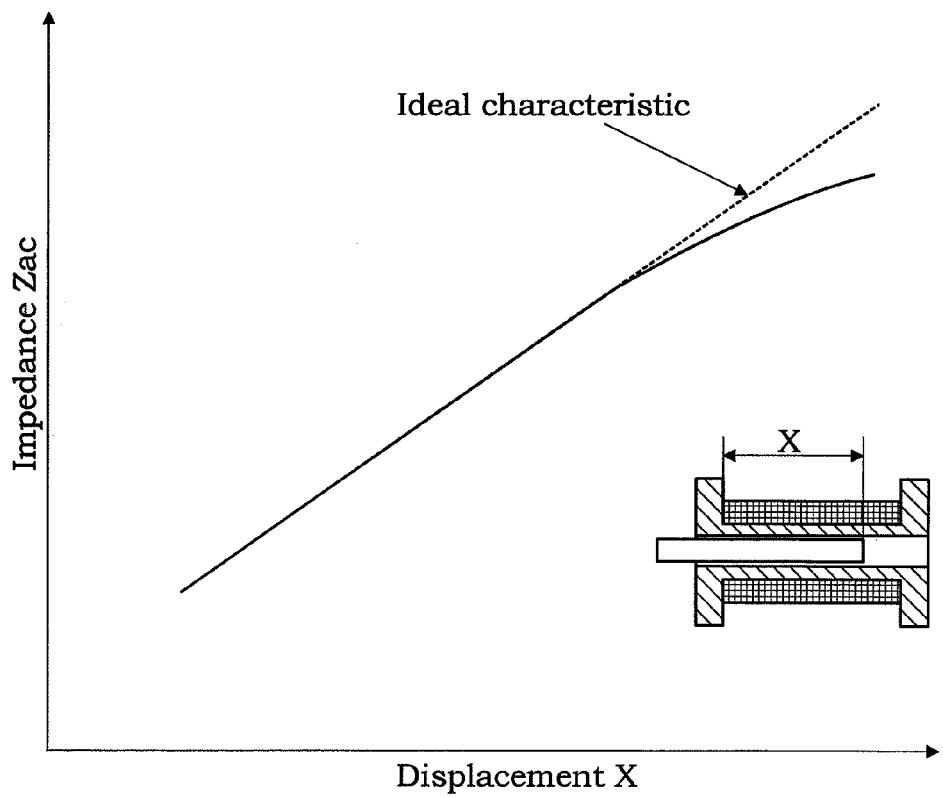
FIG. 15 is a graph showing a change in impedance of a detection coil depending on a displacement amount of a core.
Figure 14C:
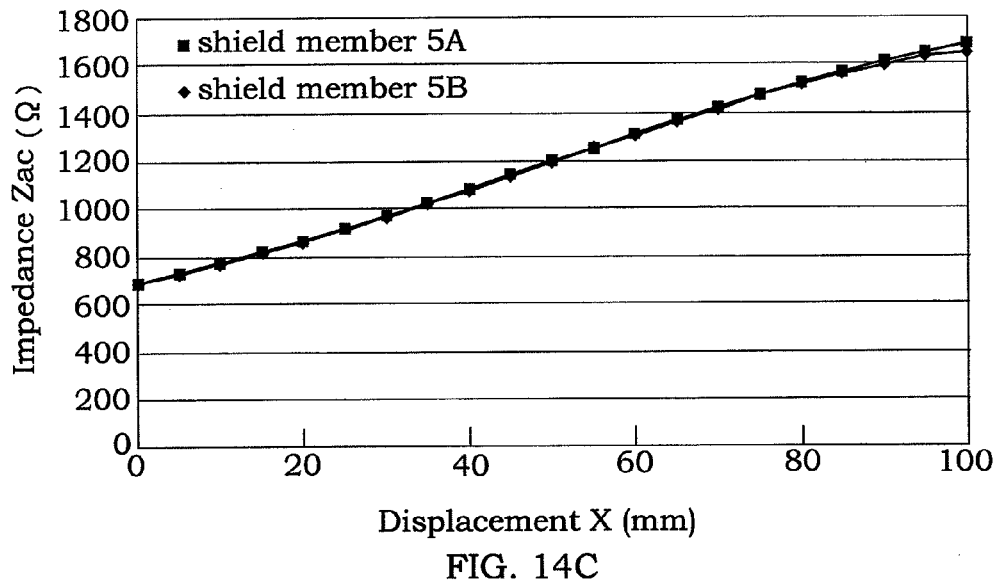
FIG. 14C is a graph showing a relationship between displacement and coil impedance in the case of using these shield members.
Figure 14D:
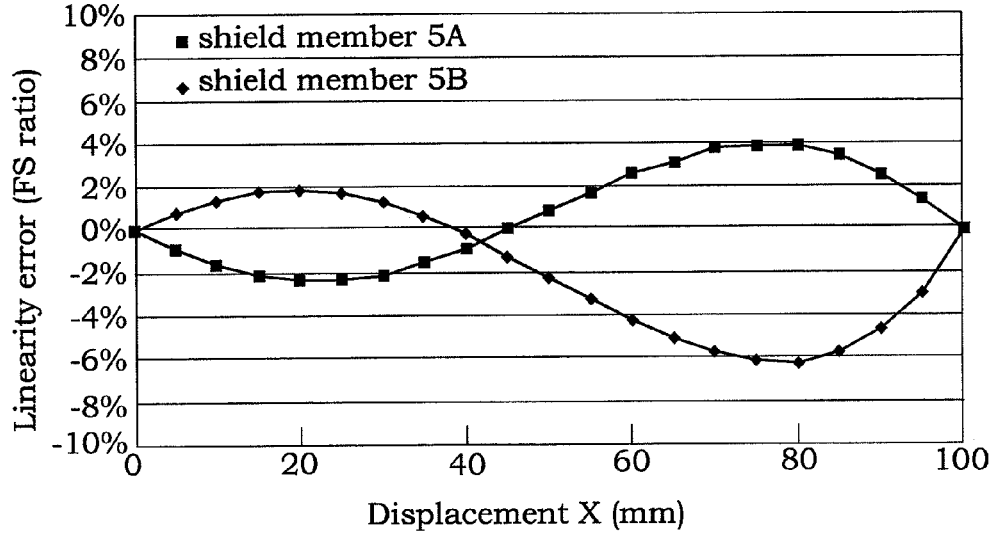
FIG. 14D is a graph showing a relationship between displacement and linearity error of coil impedance in the case of using these shield members.

The detection coil 1 is disposed in each of these shield members (5A, 5B), and a change in impedance of the detection coil 1 relative to the displacement of the magnetic core 2 was measured. Results are shown in FIG. 14C. In the case of using the shield member 5B, when the displacement (X) exceeds 90 mm, the increasing amount of impedance gradually decreases, so that a deviation from the ideal characteristic occurs, as shown in FIG. 15. On the other hand, in the case of using the shield member 5A of the present invention, even when the displacement (X) exceeds 95 mm, the linearity of impedance can be maintained. That is, it shows that the deviation from the ideal characteristic can be corrected by the formation of the second tubular portion 71. FIG. 14D shows a relationship between displacement and linearity error of coil impedance according to the above evaluation test results.

In each of the above embodiments, the shield member having the cylindrical shape was mainly explained. However, the same effect of improving the linearity of coil impedance can be obtained in the case of using the shield member having a rectangular tubular shape. In addition, the position sensors of the above embodiments belong to a linear type (linear motion type) that the magnetic core is movable on a straight-line axis. Besides, the shield member of the present invention can be equivalently utilized for a rotational-type (curvilinear motion type) position sensor that the magnetic core is movable on a curved-line axis.

INDUSTRIAL APPLICABILITY

As described above, according to the present invention, since at least one of the shape of cross section, the kind of material and dimensions of the shield member is not uniform in an axial direction of the detection coil (a stroke direction of the magnetic core), and a detecting portion comprised of the magnetic core and the detection coil is disposed in the shield member, it is possible to improve the linearity of coil impedance, and consequently provide a compact position sensor with a stable detection accuracy over the stroke range of the magnetic core. Therefore, the position sensor of the present invention is expected to be used in various technical fields such as internal combustion and electric power facility.

The invention claimed is:

1. A position sensor comprising:
   a tubular detection coil;
   a magnetic core movable in said detection coil;
   a drive circuit configured to provide a constant alternating voltage or a constant alternating current to said detection coil;
   a signal processing circuit configured to convert a change in impedance of said detection coil caused by a displacement of said magnetic core in said detection coil into an electric signal; and
   a shield member disposed around said detection coil;
   wherein said shield member has at least one of the following features (a) to (c) for improving linearity of impedance of said detection coil:
   (a) said shield member is a tubular member having an axial region, which is formed in an electrically discontinuous manner with respect to a circumferential direction of said tubular member;
   (b) said shield member is a tubular member having a first shield portion for surrounding an axial region of said detection coil, and a second shield portion for surrounding another axial region of said detection coil, and said second shield portion is made of a material having a different electric conductivity or magnetic permeability from said first shield portion;
   (c) said shield member is a tubular member having a first inner surface for surrounding an axial region of said detection coil, and a second inner surface for surrounding another axial region of said detection coil, and a distance between said second inner surface and said detection coil is smaller than the distance between said first inner surface and said detection coil.

2. The position sensor as set forth in claim 1, wherein said axial region of said shield member has a substantially C-shaped cross section.

3. The position sensor as set forth in claim 1, wherein said shield member is formed with an outer tube and a inner tube having an axial length smaller than said outer tube, and said inner tube is disposed in said outer tube.

4. The position sensor as set forth in claim 3, wherein said inner tube is made of a material having a different electric conductivity or magnetic permeability from said outer tube.

5. The position sensor as set forth in claim 3, wherein said shield member has an electrical insulating layer formed between said outer tube and said inner tube.

6. The position sensor as set forth in claim 3, wherein said inner tube is made of ferrite.

7. The position sensor as set forth in claim 3, wherein an axial region of said outer tube has a substantially C-shaped cross section.

8. The position sensor as set forth in claim 3, wherein an axial region of said inner tube has a substantially C-shaped cross section.

9. The position sensor as set forth in claim 1, wherein said shield member is made of a ferromagnetic material, and at least has an axial length substantially equal to said detection coil.

10. The position sensor as set forth in claim 9, wherein said shield member has the axial length including a movable range of said magnetic core and a total length of said detection coil.

11. The position sensor as set forth in claim 1, wherein said shield member has a plating layer of a metal material having high electrical conductivity on its outer surface.

12. The position sensor as set forth in claim 1, wherein said shield member is electrically connected to a stable potential point of one of said drive circuit and said signal processing circuit.

* * * * *